Jan. 17, 1939.   R. R. LA PELLE   2,144,497
PROCESS FOR FREEING GAS OF OXYGEN
Filed Nov. 21, 1935
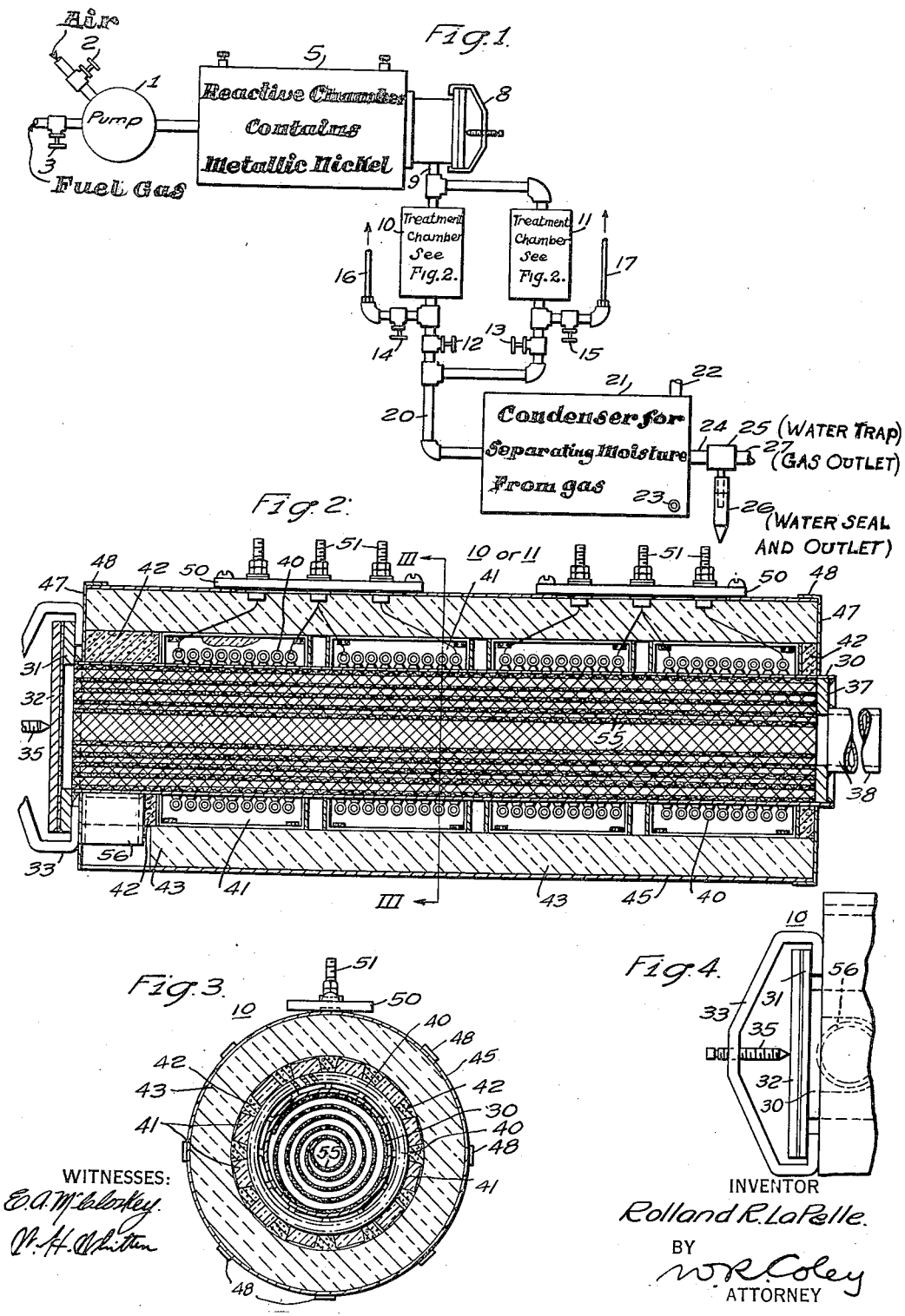

Patented Jan. 17, 1939

2,144,497

UNITED STATES PATENT OFFICE 2,144,497

PROCESS FOR FREEING GAS OF OXYGEN

Rolland R. La Pelle, Wilkinsburg, Pa., assignor to Westinghouse Electric & Manufacturing Company, East Pittsburgh, Pa., a corporation of Pennsylvania Application November 21, 1935, Serial No. 50,899

6 Claims. (Cl. 23—3)

This invention relates to the preparation of gas for use in connection with treatments requiring a reducing atmosphere such as in annealing furnaces. It is particularly concerned with the removal of oxygen from the gas.

It is an object of the invention to remove the oxygen by the action of a material which can be used repeatedly.

It is a further object of the invention to provide a chamber for the treating of the gas into which the treatment material may be readily inserted and readily removed when it is necessary to renew it.

It is a further object of the invention to provide an apparatus by which the gas, with only a small percentage of oxygen present, can be delivered to the chamber containing the material for removing oxygen and can be delivered from said chamber either to the annealing furnaces or to the atmosphere as desired.

It is a further object of the invention to provide a chamber in which the gas may be treated with hot iron, said chamber having means for heating it and means for permitting a flow of gas therethrough at a convenient rate or for restricting the flow to a mere bleed.

It is a further object of the invention to provide the iron in said treatment chamber in the form of expander metal wound into a cylindrical shape.

Other objects of the invention and details of the process and of structure employed will be apparent from the following description and the accompanying drawing in which:

Figure 1 is a general schematic diagram of the apparatus;

Fig. 2 is a longitudinal section of the chamber in which the treatment for the removal of oxygen is performed;

Fig. 3 is a sectional view on the line III—III of Fig. 2; and

Fig. 4 is a detailed view of the arrangement for closing the end of the chamber.

The apparatus includes a pump shown diagrammatically at 1 which can deliver a mixture of air and gas. The air may be introduced through a valve 2 and the gas through a valve 3. Although the invention is adapted to the treatment of many gases, the gas for which it is particularly designed and which will ordinarily be introduced through the valve 3 is natural gas of the kind found commonly in Ohio, consisting almost entirely of methane and ethane. The process is also especially applicable to other gases such as artificial gas from coke ovens, gas producers or the like. The valves 2 and 3 are so adjusted that the pump delivers a mixture in which the proportion varies from equal parts of air and gas to nine parts of air to one of gas.

This mixture is delivered to the chamber 5 which need not be described in detail. The pump delivers the mixture at a pressure of from a few inches of water up to three or four pounds per square inch and the pressure throughout the system is the same except for the drop required to sustain the flow. The reactive chamber 5 contains metallic nickel and may, if desired, be externally located in any suitable manner. Any form of nickel may be used which has a large surface in proportion to its mass but errot wire is usually most convenient. At the end opposite the pump the cylinder has a hole closed by a clamped-in place cover as shown at 8. By removing the cover 8 the nickel may be inserted or removed. Under the action of the heat and the nickel the gas is partly burned and partly cracked so that there emerges at 9 a mixture made up largely of steam but including a number of constituents not as readily condensed. The principal one of these is nitrogen, but hydrogen, carbon-monoxide and carbon dioxide occur. There is also present a small amount of oxygen.

The proportion of these constituents will depend upon the proportion of air and gas in the mixture admitted. If the amount of air admitted be small, say less in volume than five times the gas, there will remain some methane in the mixture. At any proportion of air to gas which is practical, the nitrogen will be the largest percentage of the final mixture, and if the proportion be from 7 to 8 times as much air as gas, the nitrogen will greatly exceed any of the other constituents in the energizing mixture. A more detailed statement of these relations may be found in the patent to Wilbur S. Bowling, No. 1,979,820, issued Nov. 6, 1934.

The mixture passes through the outlet 9 to two treatment chambers 10 and 11 in parallel. Valves 12 and 13 permit the gas to flow through one or the other of these chambers or to be retained in either chamber. Valves 14 and 15 control the bleeds 16 and 17 from the chambers 10 and 11, respectively, so that, when a valve 12 or 13 is closed, the gas is not passing through the chamber in a stream of any considerable amount. It is substantially stationary in the chamber, emerging therefrom very slowly through the valve 14 and the bleed 16 or through valve 15 and bleed 17.

When the gas passes in a considerable stream, it emerges through valves 12 or 13 into a connection 20 and so to a condenser 21. The condenser contains cooling pipes, the terminals of which are shown at 22 and 23. Cold water flows in these pipes. It is also permissible to pass the gas through these pipes and fill the cylinder 21 with cold water. The cold gas emerges at 24 and enters a water trap 25. The water in the gas is then in the form of droplets because the gas has been cooled sufficiently for the water to condense. The droplets are caught in the trap 25 and emerge to a water seal 26. The gas emerges through a connection 27 to the annealing ovens or whatever other place it is to be used.

The chambers 10 and 11 are alike. As shown in Fig. 2, they include a metallic tube 30 which is welded at the entrance end to a collar 31, affording a seat for a cover plate 32. This plate may be secured in place by a form of clamp including a yoke or spider 33 and a screw 35. At the other end, the tube 30 may be welded to an annular plate 37 which in its turn is welded to a pipe 38 which leads to the valve 12 or 13. The tube 30 and its associated parts are preferably made of an alloy containing 25% chromium, 12% nickel and the remainder iron but any metal having good resistance to corrosion may be used.

Around the tube 30 electrical heating conductors 40 are arranged. These are mounted in annularly assembled porcelain blocks 41 which are of comb-like shape in longitudinal section, the spaces between the teeth of the comb carrying the conductors 40 of the heater. The spaces between the blocks and the spaces adjacent the tube 30 at the ends of the series of blocks are filled with a cementing material 42 of heat-resisting properties such as asbestos cement.

The assemblage, including the tube 30 and the heaters, is surrounded with heat-insulating material such as asbestos 43. Upon the outside of the asbestos a sheet steel covering 45 is provided which is completed by means of sheet steel end pieces 47 attached by spot welded ears 48.

Terminal blocks 50 carrying terminals 51 from which connections may be made to the several heaters are mounted upon the cylindrical surface of the sheet steel covering 45. The tube 30 is filled with a mesh 55 preferably of expanded metal, such as iron or a mild steel. Expanded metal in sheet form is rolled around a mandrel to prepare this filling. The connection from the pipe 9 to the chamber 10 or 11 is illustrated at 56 in Fig. 2, and the exit from it, shown at 38, is through valve 12 or 13.

In the use of the device, a cartridge made by rolling a sheet 55 of expanded metal into a cylindrical body is inserted through the opening in the collar 31. The cartridge need not be of the length of the cylinder 30 and several cartridges may be used to fill the cylinder. When they are in place, the plate 32 is put onto the collar 31, a washer of asbestos or similar heat-resistant material being inserted between them if desired. The screw 35 is then tightened until a gas-tight connection is provided.

Hot gas from chamber 5, consisting principally of nitrogen, but containing hydrogen, carbon monoxide and carbon dioxide as well as a small percentage of oxygen, is admitted to treatment chambers 10 and 11 through the pipe 9. With valves 13 and 14 closed and valves 12 and 15 open, a stream of gas passes through the cylinder 10 and a very slow stream of gas, almost stationary, passes through the cylinder 11 and the bleed 17, to atmosphere, where it burns.

The oxygen in the gas which enters the cylinder 10 reacts with the iron 55 therein at a temperature of from 1000° to 1100° F. In the operation fo the system after it has once been started, this temperature is obtained from the hot gas and the heaters 40 are not used after a predetermined initial period. The reaction oxidizes the iron and so removes oxygen from the gas, whereby the gas entering the pipe 20 is substantially free from oxygen. The gas entering the cylinder 10 usually contains somewhat under 0.1% of oxygen and the gas emerging from the cylinder contains approximately 0.0001%.

While the cylinder 10 is being used to thus treat a stream of gas, the nearly stationary gas in the cylinder 11 reacts with the iron 55 in that cylinder which during this time is heated by the heaters 40 to from 1400° to 1500° F. This reaction consists in a reduction of any oxidized iron, that is, an oxidation of the reducing agents in the gas, principally hydrogen, and produces a small amount of water which is retained in the gas as steam. When the mass including iron oxide in cylinder 11 has thus been reduced, there is no further reaction between it and the gas, and the temperature in this cylinder is permitted to fall to from 1000° to 1100° F., when the valve 13 is opened and the valve 15 closed. Gas may then flow in parallel through cylinders 10 and 11, but if by this time the iron in the cylinder 10 has become oxidized to such an extent as to be inefficient in removing oxygen from the gas, the valve 12 will be closed and the valve 14 opened and the cylinder 11 depended upon to remove the oxygen.

The gas passes from the pipe 20 through the condenser 21, and the water which it contains is condensed into a mist and passes with the gas through pipe 24 into the water trap 25. The droplets of water are there united into an ordinary body of liquid and delivered to the water outlet 26. The gas itself will not pass through outlet 26, being retained by the water seal therein. The gas emerging through the pipe 27 is used to provide the annealing atmosphere in annealing furnaces or for any other purpose intended.

When the valve 12 is closed, the gas in the cylinder 10 becomes nearly stationary, the temperature of the cylinder 10 is then raised to from 1400° to 1500° F. and the reducing action already described for cylinder 11 takes place in cylinder 10. When this reaction has been completed the temperature is lowered to from 1000° to 1100° F., valve 12 is again opened and cylinders 10 and 11 may work in parallel. When cylinder 11 has reached the condition in which it again needs its iron oxide reduced, the valve 13 is closed.

It is thus apparent that one or the other of the cylinders 10 or 11 is always in condition to remove oxygen from the gas passing through it, and during at least some of the time both cylinders are in this condition. One cylinder, however, will always have been in use as an oxygen-removing chamber for a longer time than the other. One, therefore, will reach the condition in which it must be reduced, while the other is still usable for removing oxygen. Thus it will never be necessary to close valves 12 and 13 at the same time. Valves 14 and 15 may if desired remain permanently open. The bleeds 16 and 17 may be made so small that loss of gas by having the bleed work when it does not need to is negligible.

Other metals than iron may be used in such a process. Copper, for example, at about 700° F. will absorb oxygen from a mixture of gases and if the mixture contains reducing agents, at about 1000° F. it will reduce the copper oxide, restoring the copper to be used again with more of the same mixture. Any oxidizable metal that by change of temperature can be reduced could be used in the same way.

Many variations in the structure of the apparatus and in the process by which the gas is freed from oxygen will occur to those skilled in the art, and I do not wish to be limited by the details recited in this specification.

I claim as my invention:

1. The process of treating a mixture of gases containing reducing agents and a small percentage of oxygen, which consists in treating a stream of the mixed gases with a mass of iron at a temperature of from 1000 to 1100 degrees Fahrenheit to remove oxygen from the gas by oxidizing reaction on said mass, then treating the resulting mass at a temperature of from 1400 to 1500 degrees Fahrenheit with a body of said mixture moving more slowly than said stream and thus including a smaller amount of the gases to reduce the said resulting mass to its original degree of oxidation, the gas which was used in reducing being thereafter kept separated from the gas which was freed from oxygen.

2. The process of treating a mixture of gases containing hydrogen and a small percentage of oxygen, which consists in treating a stream of the mixed gases with a mass of iron at a temperature of from 1000 to 1100 degrees Fahrenheit to remove oxygen from the gas by oxidizing reaction on said mass, then treating the resulting mass at a temperature of from 1400 to 1500 degrees Fahrenheit with a body of said mixture moving more slowly than said stream and thus including a smaller amount of the gases to reduce the said resulting mass to its original degree of oxidation, the gas which was used in reducing being thereafter kept separated from the gas which was freed from oxygen.

3. The process of treating a mixture of gases containing hydrogen, carbon monoxide and a small percentage of oxygen, which consists in treating a stream of the mixed gases with a mass of iron at a temperature of from 1000 to 1100 degrees Fahrenheit to remove oxygen from the gas by oxidizing reaction on said mass, then treating the resulting mass at a temperature of from 1400 to 1500 degrees Fahrenheit with a body of said mixture moving more slowly than said stream and thus including a smaller amount of the gases to reduce the last said resulting mass to its original degree of oxidation, the gas which was used in reducing being thereafter kept separated from the gas which was freed from oxygen.

4. The process of treating a mixture of gases containing reducing agents and a small percentage of oxygen, which consists in treating a stream of the mixed gases with a mass of iron at a temperature of from 1000 to 1100 degrees Fahrenheit to remove oxygen from the gas by oxidizing reaction on said mass, then treating the resulting mass at a temperature of from 1400 to 1500 degrees Fahrenheit with a body of said mixture moving more slowly than said stream, thus including a smaller amount of the gases to reduce the resulting mass to its original degree of oxidation, and alternating the condition involving said smaller velocity of the gases and said higher temperature of the iron with the first-described condition.

5. The process involving a metal and its oxide capable of being oxidized and reduced respectively, in the removal of oxygen from a mixture of gases containing reducing agents and a small percentage of oxygen which consists in treating a stream of the said mixed gases with said metal at an elevated temperature at which the oxygen reacts with said metal to form a mass including the oxide of said metal, then treating the last said mass at a higher temperature at which the said oxide is reduced by said reducing agents with a body of said gaseous mixture moving more slowly than said stream.

6. In a process for passing a mixture of gases originally containing a reducing gas and a small percentage of oxygen in a continuous stream to an apparatus which consists of dividing the stream into two parallel branches, one branch of which is led to said apparatus and the other branch to a separate outlet, treating the stream in said one branch with a mass of metal at a range of temperatures at which said mass is oxidizable by the oxygen of the last said stream, treating the stream in the said other branch with a mass of oxide of said metal at a higher temperature and at which the last said mass is reduced by the reducing gas of last said stream, the stream in said one branch having a rate of flow appreciably greater than that in said other branch, and alternating the conditions of flow and temperature over the said masses, whereby a continuous flow of treated gas mixture to said apparatus is obtained.

ROLLAND R. LA PELLE.